United States Patent
Lu et al.

(10) Patent No.: US 8,073,383 B2
(45) Date of Patent: Dec. 6, 2011

(54) METHOD AND APPARATUS FOR LONG-TIME MUSIC PLAY ON A MOBILE COMMUNICATION TERMINAL

(75) Inventors: Dawei Lu, Guangdong (CN); Huiyao Wang, Guangdong (CN); Wenjun Zhang, Guangdong (CN)

(73) Assignee: T&A Mobile Phones Shenzhen Ltd., Guangdong (CN)

( * ) Notice: Subject to any disclaimer, the term of this patent is extended or adjusted under 35 U.S.C. 154(b) by 897 days.

(21) Appl. No.: 12/003,786

(22) Filed: Dec. 31, 2007

(65) Prior Publication Data
US 2009/0068942 A1   Mar. 12, 2009

(30) Foreign Application Priority Data

Sep. 7, 2007  (CN) .......................... 2007 1 0076921
Sep. 7, 2007  (CN) .......................... 2007 1 0076922

(51) Int. Cl.
*H04H 60/05* (2008.01)
(52) U.S. Cl. ................................. 455/3.06; 455/550.1
(58) Field of Classification Search ........................ None
See application file for complete search history.

(56) References Cited

U.S. PATENT DOCUMENTS

| | | | |
|---|---|---|---|
| 7,814,220 B2 * | 10/2010 | Rydenhag | 455/550.1 |
| 2002/0184039 A1 * | 12/2002 | Gong et al. | 704/500 |
| 2006/0188117 A1 * | 8/2006 | Kim | 381/315 |
| 2007/0232358 A1 * | 10/2007 | Sherman | 455/560 |
| 2007/0298834 A1 * | 12/2007 | Rofougaran | 455/552.1 |

* cited by examiner

*Primary Examiner* — Thanh Le
(74) *Attorney, Agent, or Firm* — Morgan, Lewis & Bockius LLP

(57) ABSTRACT

A method and apparatus are provided for playing music for long time by a mobile communication terminal. The mobile communication terminal includes an MP3 chip for decoding and playing music data transferred from a music data memory by a baseband chip.

4 Claims, 4 Drawing Sheets

METHOD AND APPARATUS FOR LONG-TIME MUSIC PLAY ON A MOBILE COMMUNICATION TERMINAL

BACKGROUND OF THE INVENTION

1. Field of the Invention

The present invention relates to the field of mobile communications, and more particularly to a method and apparatus for long-time music play on a mobile communications terminal.

2. Description of the Related Art

Mobile phones conventionally have the capability to play music for entertainment. Users of mobile phones desire ever greater storage capacity for music and advancements in the storage capacity of memory devices and in processing speed have been used to meet that desire.

As shown in FIG. 1, conventional music-playing mobile phones encode/decode music data using the conventional components of the mobile phone which are also used for other functions. As shown in FIG. 1, the central cell phone chip 11 (also known as the baseband chip) receives music data from music memory 17, decodes the data and provides it to the loudspeaker or earpiece of the mobile phone. The selection and operation of music play is initiated by a user through the keyboard 13. However, if the audio data is encoded/decoded by the conventional mobile phone components to play music, the result will be increased energy consumption, shorter battery life, and shortened battery standby time. Moreover, the quality of the music play is degraded when the audio data is encoded/decoded by the conventional mobile phone components, so that users cannot enjoy high-quality music.

Therefore, a method and apparatus to play music on a mobile phone with better sound quality and longer battery life is required to meet the demands of users.

SUMMARY OF THE INVENTION

An object of the present invention is an apparatus for long-time music play on a mobile communications terminal for solving the problems of the short play time and poor quality of the music play by the conventional mobile phones.

A further object of the present invention is an improved method for playing music on a mobile communications terminal using a baseband processor and an MP3 processor.

These and other objects of the present invention are achieved by a method to play music by a mobile communications terminal including an MP3 chip in addition to a baseband processor, comprising the steps of accessing music data in a memory of a baseband chip, transmitting the accessed music data from the baseband chip to the MP3 chip by a UART channel, and receiving and decoding the music data by the MP3 chip to play the music.

A further aspect of the present invention comprises mobile communications terminal equipment for playing music with high fidelity, comprising a mobile phone chip, a memory coupled to the mobile phone chip for storing music data, a speaker for playing music, an MP3 chip having an internal memory, the MP3 chip being coupled to the mobile phone chip for bi-directionally transferring control information between the mobile phone chip and the MP3 chip and being further coupled to the mobile phone chip for receiving and temporarily storing the music data in the internal memory for decoding the music data to play music on the speaker.

BRIEF DESCRIPTION OF THE DRAWINGS

The accompanying drawings are included to provide a further understanding of the present invention, and are incorporated in and constitute a part of this specification. The drawings illustrate embodiments of the invention to explain the principles of the invention.

DESCRIPTION OF THE PREFERRED EMBODIMENTS

The present invention will be described in more detail with reference to the drawings and a description of the preferred embodiment to clearly understand its objectives, solutions and advantages thereof.

Figure 1:
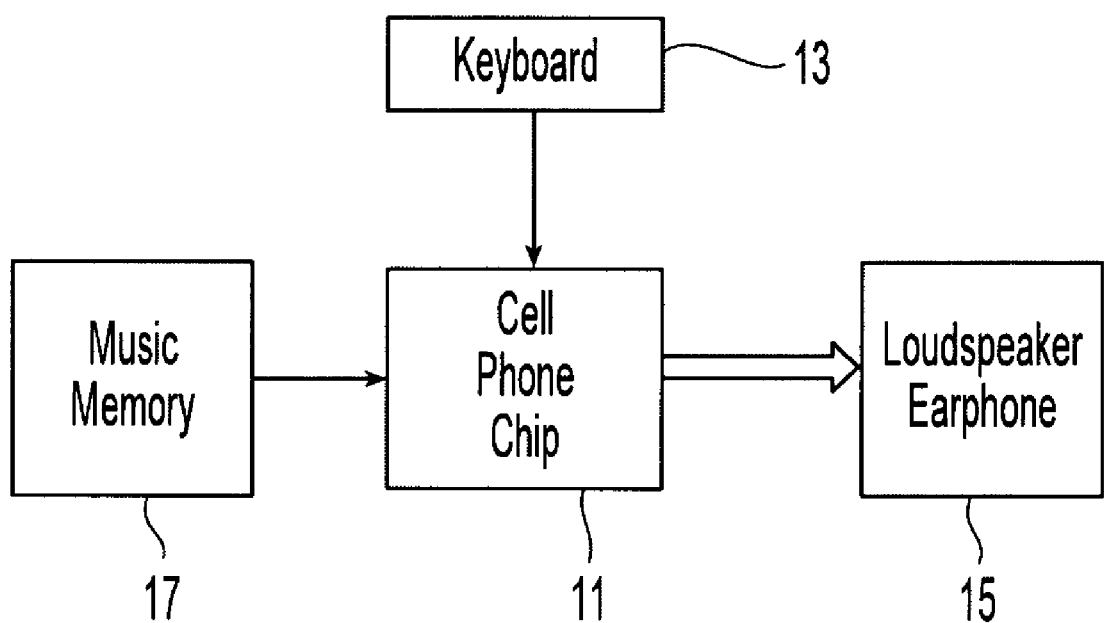
FIG. 1 is a schematic structural view of a conventional mobile communication terminal having music playing capability.
Figure 2:
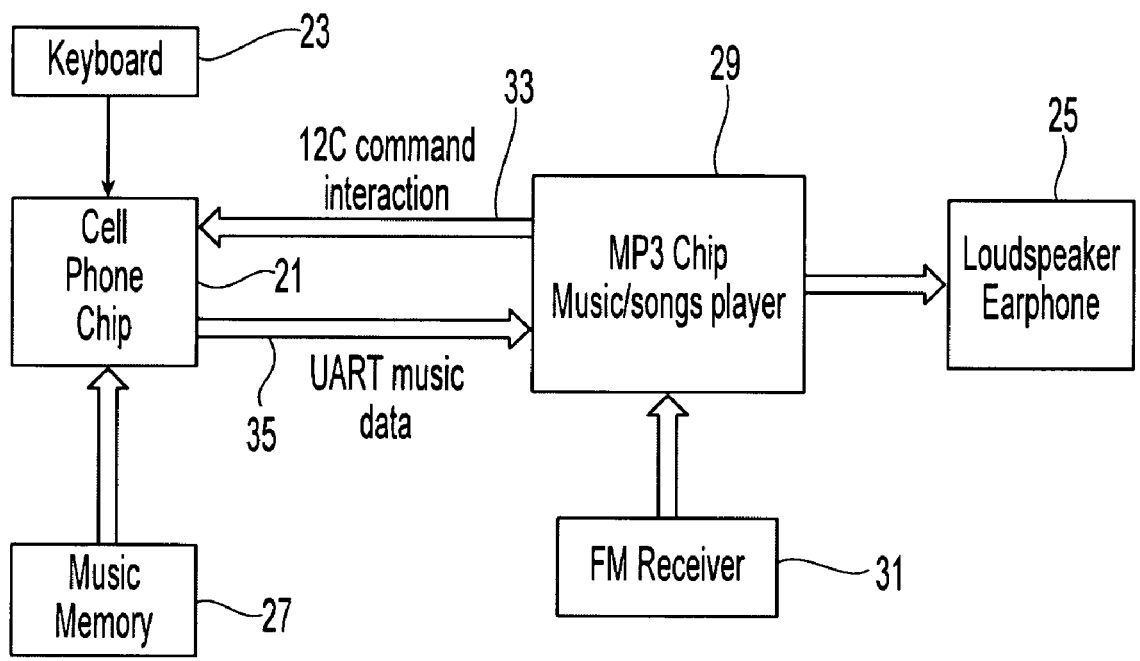
FIG. 2 is a schematic structural view of a preferred embodiment of the mobile communication terminal equipment according to the present invention.

FIG. 2 is a schematic structural view of mobile communications terminal equipment, such as a mobile phone, according to a preferred embodiment of the present invention. The mobile phone includes a mobile phone chip 21, an MP3 chip 29, a music memory 27, an FM receiver 31, a speaker and/or earphone 25.

The music memory 27 stores music data and is connected to the mobile phone chip 21. The mobile phone chip 21 includes a music manager to manage music received from the music memory. The mobile phone chip 21 is also connected to the MP3 chip 29. The mobile phone chip 21 bi-directionally communicates with the MP3 chip 29 through commands transmitted over an I2C bus 33, e.g., by transmitting to the MP3 chip 29 commands such as play, pause and stop. The mobile phone chip 21 also transmits music data to the MP3 chip through a UART (Universal Asynchronous Receiver Transmitter) channel 35.

The UART channel 35 is a universal serial data bus, which implements a standard industrial serial interface and is used for asynchronous communication. The UART channel 35 supports bi-directional communication to realize full duplex transmission and reception. The UART channel 35 has a high data transmission rate and may reach transmissions speeds of 921600 BPS and higher. A UART channel 35 may be adopted in a microcontroller to support data transmission at speeds ranging from a few hundreds of bits to 1.5M BPS. For example, the communication speed of a high-speed UART channel 35 embedded in an ElanSC520 microcontroller may be up to 1.1152M BPS.

In addition to the mobile phone chip 21, the MP3 chip 29 is connected the FM receiver 31 and the speaker and/or earphone 25. The MP3 chip 29 includes a music player for playing music data received from the mobile phone chip 21 or music data received from the FM receiver 31. The users can listen to the music through the speaker (used as the speaker for the mobile phone) and the earphone. The MP3 chip 29 temporarily stores the music data in an embedded memory, e.g., its RAM, and then decodes it to play the music. Since the data transmission speed over the UART channel 35 is higher than the play speed of the MP3 chip 29, the continuous playing of high quality music can be realized as music data is buffered in the embedded memory prior to decoding.

The mobile phone chip 21 may employ DMA (Direct Memory Access) in the transmission of music data from the music memory 27 to the MP3 chip 29. DMA refers to a high-speed data transmission operation that allows data reads and writes directly between an external device and the memory without the assistance or interference of the CPU of the cell phone chip 21. The entire data transmission operation is performed under the control of a so-called "DMA controller." The baseband processor in the cell phone chip 21 operates with respect to the transfer of the music data only at the beginning and end of the music data transmission, and is free to perform other unrelated operations during the time of the music data transmission. Thus, for most of the time of the music data transmission, the CPU in the cell phone chip 21 and music data input/output operate concurrently but in parallel to improve the efficiency of the entire mobile phone system.

The DMA transmission mode is preferred to transmit the music data to the MP3 chip because the baseband processor may then enter sleep mode throughout the data transmission process. The current required by the MP3 chip to play music is very low compared to the current required by the baseband processor in the mobile phone chi 21. Thus, the current required to play music is very low and the battery life of the mobile phone is extended when the phone is in the music playing mode.

The mobile communication terminal equipment according to the present invention provides high extensibility and customizability of the sound effect. The MP3 chip 29 preferably uses a software decoder and outputs an audio signal with high signal-to-noise ratio (SNR). In addition, because of the use of the MP3 chip 29 the following sound effects are supported: equalization, bass boost, sound mixing, automatic volume leveling, 3D sound effect, etc.

Figure 4:
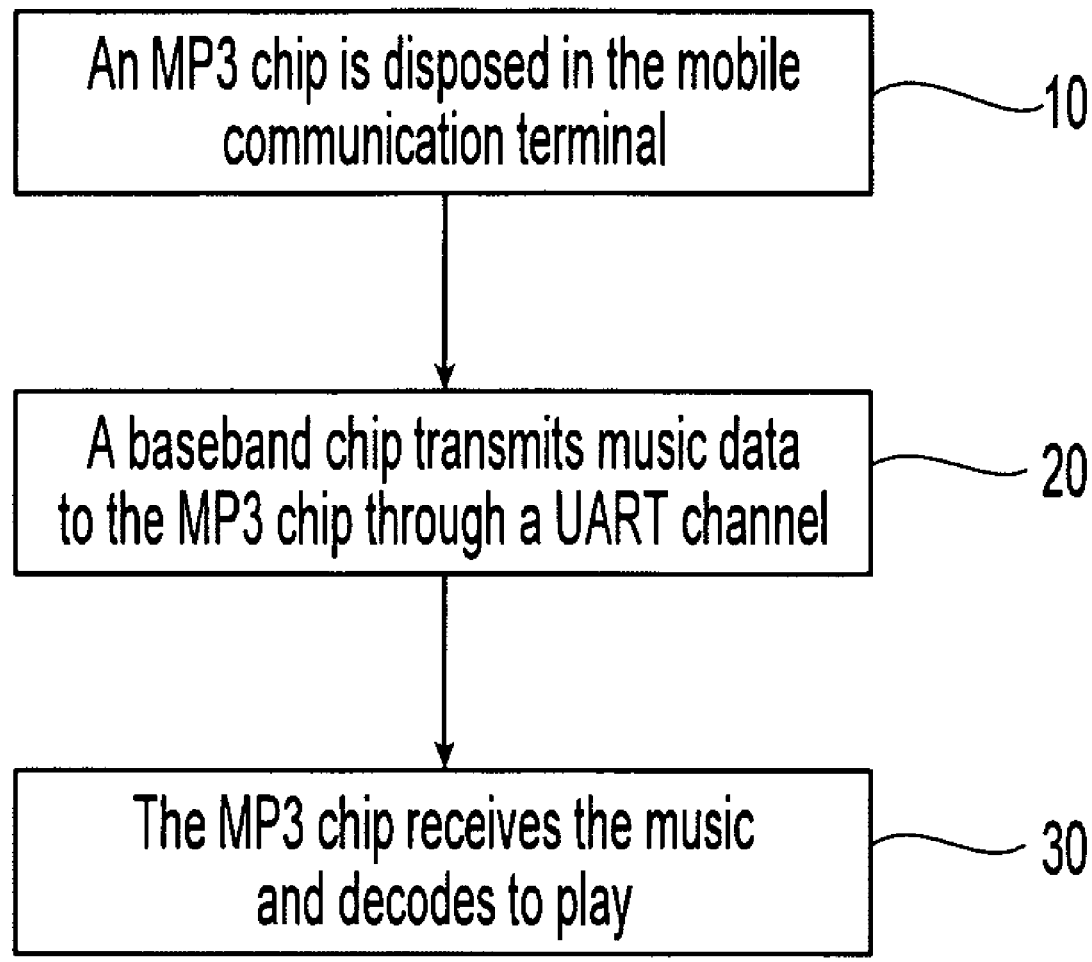
FIG. 4 is a flow chart illustrating a procedure to enable the MP3 chip according to the method to play music for long time by a mobile communications terminal of the present invention.

FIG. 4 is a flow diagram illustrating a method to play music by the mobile communication terminal of the present invention for longer time than in conventional mobile phones. In step 10, an MP3 chip 29 is disposed in the mobile communication terminal. In step 20, a baseband chip in the cell phone chip 21 transmits music data to the MP3 chip 29 via the UART channel 35, and performs command interaction such as transmitting commands like play, pause, and stop with the MP3 chip 29 through the I2C bus 33. In step 30, the MP3 chip 29 temporarily stores the music data in its onboard or embedded RAM and decodes the data to play music.

Figure 3:
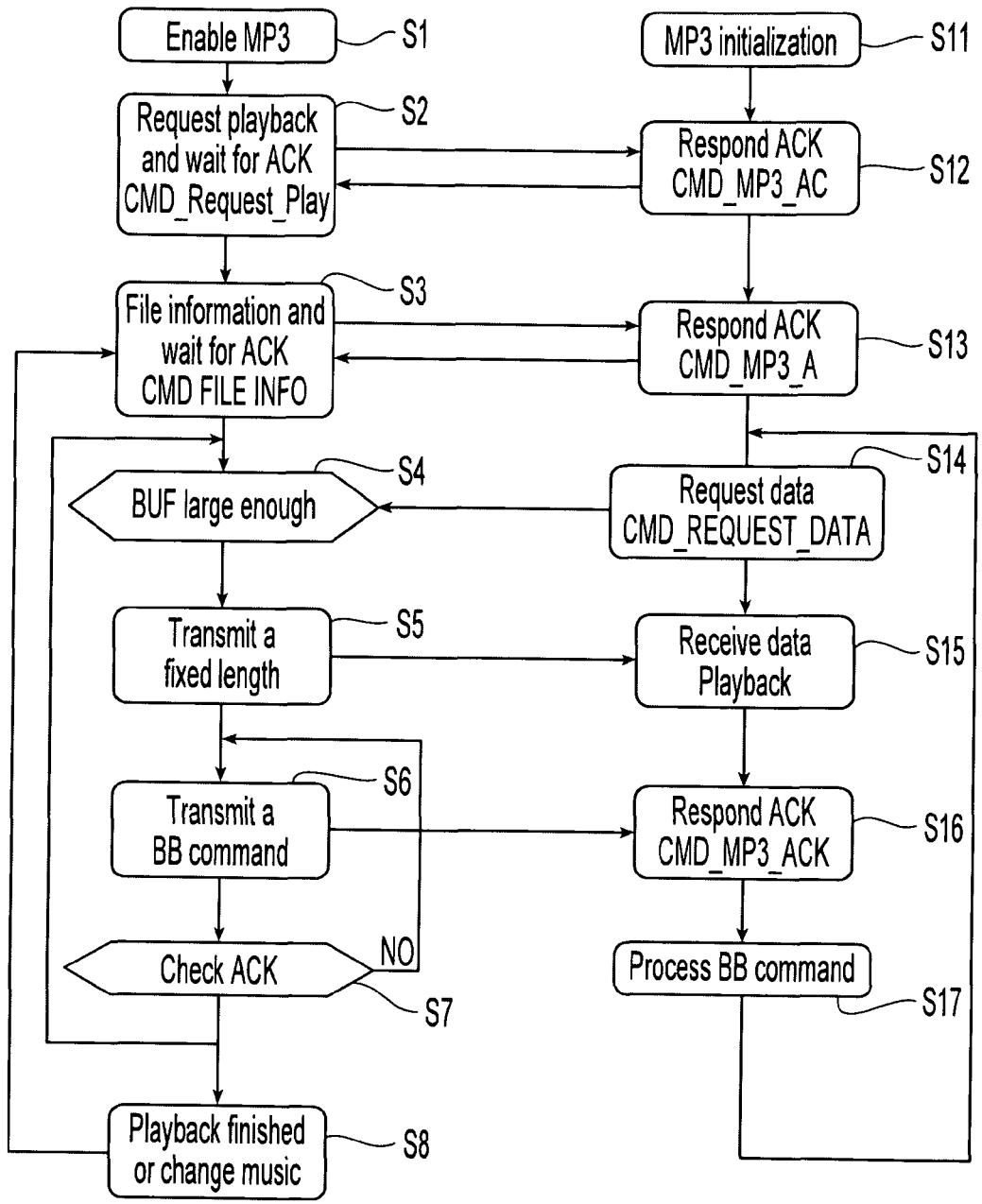
FIG. 3 is a flow chart illustrating a method to play music for long time by a mobile communication terminal of the present invention.

FIG. 3 is a flow chart illustrating a procedure to enable the MP3 chip 29 according to the method to play music for long time by a mobile communications terminal of the present invention.

In step S2, the baseband chip (cell phone chip 21) requests the MP3 chip 29 to play and waits for an ACK (ACKnowledge Character), which is a transmission control character transmitted from a receiving station to a transmitting station for confirming the correct reception of the transmitted data. Usually, the ACK signal has a unique format and length and is a response by the receiver to the transmitter. The format of the ACK signal depends on the adopted network protocol. The transmitter may transmit the next data upon receiving the ACK signal. Alternatively, depending on the adopted network protocol, if the transmitter does not receive the ACK signal, it may transmit the current data package repeatedly or stop transmitting. The ACK signal differs in different protocols. The MP3 chip 29 responds with the ACK signal in step S11.

In step S3, the baseband chip provides file information and waits for an ACK from the MP3 chip 29 in step S12.

The MP3 chip 29 requests music data from the baseband chip in step S14. The baseband chip transmits fixed-length data to the MP3 chip 29 in step S5, and the MP3 chip 29 receives, decodes, and plays the music data in step S15.

The baseband chip transmits a processing command to the MP3 chip 29 in step S6 and both chips are synchronized by an INT signal, which is an interrupt signal. For the convenience of communicating between the two systems, synchronization may be achieved by means of interrupt. After the interrupt signal is generated, the I2C bus 33 transmits commands and the UART data channel 35 transmits data.

The MP3 chip 29 responds with the ACK again in step S16, which is a request of the mobile phone system on the MP3 system to respond to a command operation.

Exemplary commands that the baseband chip requests the MP3 chip writing data are listed below:

| S | 0x1A | W | ACK | CommandID | ACK | DATA | ACK |
|---|---|---|---|---|---|---|---|

| Command ID | Length | Data | Direction | Description |
|---|---|---|---|---|
| CMD_REQUEST_PLAY | 1 | byte0: file format 0: MP3 Others: reserved | BB->MP3 | request for play |
| CMD_FILE_INFO | 4 | byte0-3: start to play OFFSET (in bytes), calculate from MP3 data | BB->MP3 | file information |
| CMD_KEY_VOL | 1 | VOL value | BB->MP3 | VOL |
| CMD_KEY_EQ | 1 | EQ type | BB->MP3 | EQ |
| CMD_KEY_PLAY | 0 | | BB->MP3 | PLAY |
| CMD_KEY_PAUSE | 0 | | BB->MP3 | PAUSE |
| CMD_KEY_STOP | 0 | | BB->MP3 | STOP |
| CMD_GET_TIME | 0 | | BB->MP3 | enquiry play progress information |
| CMD_END_PLAY | 0 | | BB->MP3 | data transmission complete |

Exemplary UART command formats are:

| Command ID | Length | Data 0 | Direction | Description |
|---|---|---|---|---|
| CMD_REQUEST_DATA | 8 | byte0-3: idle BUF length byte4-7: received length in current transmission | MP3->BB | request data |

-continued

| Command ID | Length | Data 0 | Direction | Description |
|---|---|---|---|---|
| CMD_MP3_ACK | 4 | byte0: received command<br>byte1: command processing state<br>0: execution succeed<br>1: parameter error<br>2: unsupported command<br>3: unexecutable command<br>byte2-3: time information in seconds (just for receiving CMD_GET_TIME) | MP3->BB | response |

The present invention provides several advantages compared to the conventional mobile terminals with music-playing capability. The MP3 chip 29 outputs music with high signal-to-noise ratio (SNR) for better sound quality. The terminal equipment according to the invention provides end-users much longer battery time and frees the baseband processor for other operations unrelated to playing music.

Though the present invention has been disclosed above by reference to preferred embodiments, they are not intended to limit the present invention. Any modifications, equivalent replacements, and improvements without departing from the spirit and scope of the present invention fall within the scope of the present invention.

What is claimed is:

1. A method to play music by a mobile communications terminal including an MP3 chip in addition to a baseband processor, comprising the steps of:
   accessing music data stored in a music memory coupled to the baseband processor;
   transmitting the accessed music data from the baseband processor to the MP3 chip by a UART channel;
   receiving and decoding the music data by the MP3 chip to play the music, including enabling the MP3 chip, comprising the steps of:
   requesting the MP3 chip to play music;
   waiting for an ACK signal to be transmitted from the MP3 chip to the baseband processor;
   requesting by the MP3 chip the baseband processor for music data;
   transmitting music data from the baseband processor to the MP3 chip in response to the requesting step; and
   decoding the music data to play the music.

2. The method as claimed in claim 1, further including the step of providing commands from the baseband processor to the MP3 chip through an I2C bus.

3. The method as claimed in claim 1, further including the steps of temporarily storing music data in a memory of the MP3 chip to permit the asynchronous operation of the MP3 chip and the baseband processor and decoding the music data in the MP3 chip to play the music.

4. The method as claimed in claim 1, further including the step of transmitting music data from the music memory to the MP3 chip by means of direct memory access.

* * * * *